(No Model.)
J. W. PENFIELD.
ROLLER FOR CRUSHING AND PULVERIZING CLAY.
No. 289,026. Patented Nov. 27, 1883.
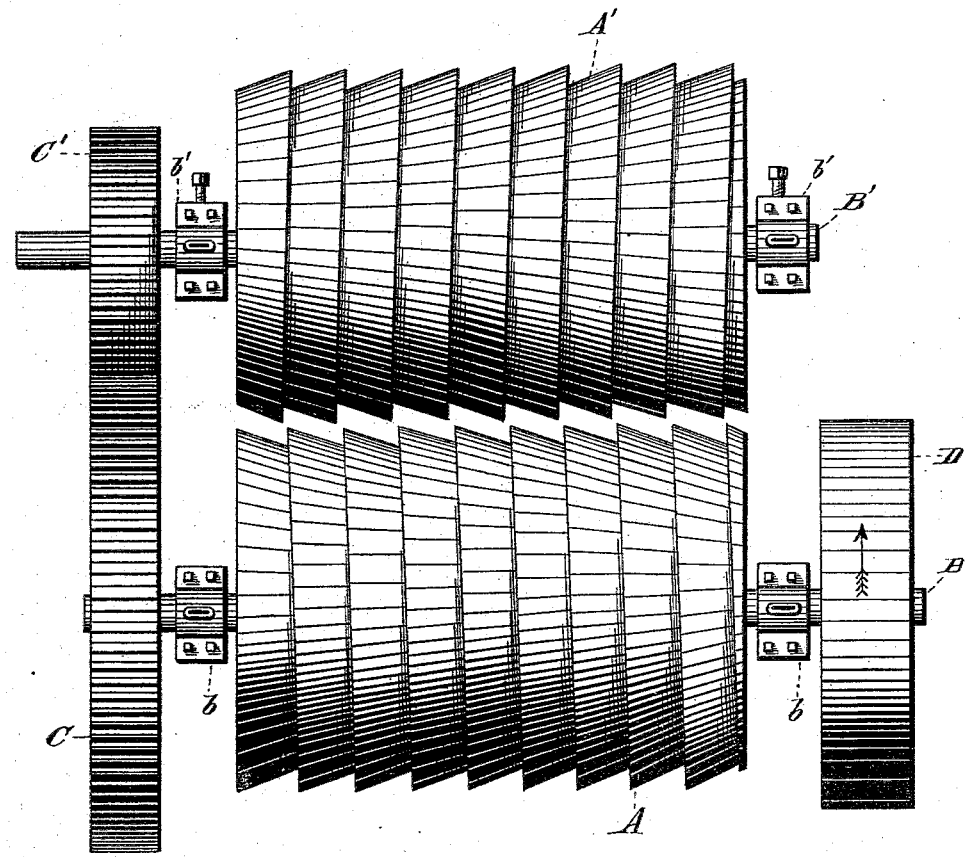
WITNESSES
W. Engel
Geo. W. King
James W. Penfield
INVENTOR
By Leggett & Leggett
ATTORNEYS
N. PETERS. Photo-Lithographer, Washington, D. C.

UNITED STATES PATENT OFFICE.

JAMES W. PENFIELD, OF WILLOUGHBY, OHIO.

ROLLER FOR CRUSHING AND PULVERIZING CLAY.

SPECIFICATION forming part of Letters Patent No. 289,026, dated November 27, 1883.

Application filed September 7, 1883. (No model.)

*To all whom it may concern:*

Be it known that I, JAMES W. PENFIELD, of Willoughby, in the county of Lake and State of Ohio, have invented certain new and useful Improvements in Rollers for Crushing or Pulverizing Clay; and I do hereby declare the following to be a full, clear, and exact description of the invention, such as will enable others skilled in the art to which it pertains to make and use the same.

My invention relates to improvements in rollers for crushing and pulverizing clay; and it consists in certain features of construction, and in combination of parts hereinafter described, and pointed out in the claims.

The drawing is a plan view of a set of rollers embodying my invention.

A and A' are rollers, respectively attached to the shafts B and B', to which are also attached the engaging-gears C and C'. The shafts are journaled in suitable boxes, $b$ and $b'$, and the latter may be made adjustable, so that the distance between the rollers may be varied a trifle. The variation, however, should not be so great as to interfere with the working of the gears. The boxes may be secured to any frame-work or support, as may be most convenient or desirable.

D is the driving-pulley by means of which the rollers are operated. As shown in the drawing, the gear C is much larger than the gear C', so that the roller A' revolves at a much higher rate of speed than the roller A. These rollers have each a continuous spiral ridge or rib around the roller from end to end, like the thread of a screw, and made, respectively, right and left handed, so that when the rollers are turned by the said engaging-gear the lead of the said thread-like ridges on each roller will be in the same direction, and will carry stones or lumps of clay that are too large to pass between the rollers to one side and discharge them from the machine. These ridges preferably cover about the entire surface of the rollers, and preferably have one long sloping side, and a short side nearly perpendicular to the axis of the roller, and are so arranged that the abrupt sides on the two rollers face each other, as shown. These rollers are set far enough apart so that their respective ridges will not collide in passing each other. As the roller A' revolves much faster than the roller A, the edges of the ridges on the respective rollers are constantly crossing the line of each other, shearing or biting the clay in a manner that greatly expedites the work of the machine.

I do not limit myself to the construction here shown in regard to the shape of the ridges. The ridges might be made in a variety of forms, any one of which might do good work and still be clearly within the spirit of my invention. A very good shape for these ridges is to have the sides equal, so that the shape would be about like a common V-thread on a screw. It may be found advisable to clip the sharp corners of the ridges a trifle, so that the edges will not crumble.

What I claim is—

1. Clay crushing or pulverizing rollers provided each with a continuous spiral ridge, groove, depression, or projection, made, respectively, right and left handed, and provided with engaging-gears of unequal diameter, or other suitable actuating mechanism, and adapted by means of revolving one roller faster than the other to make the ridges on the respective rollers cross or pass each other, substantially as described, and for the purpose set forth.

2. The rollers A and A', in combination with engaging-gears of unequal diameter, substantially as shown and described.

In testimony whereof I sign this specification, in the presence of two witnesses, this 3d day of September, 1883.

JAMES W. PENFIELD.

Witnesses:
G. H. WHITEHEAD,
J. J. DEWEY.